United States Patent [19]
Jackson et al.

[11] 3,923,948
[45] Dec. 2, 1975

[54] THERMOFORMING PLASTIC ARTICLES

[75] Inventors: William B. Jackson, Canandaigua; Nicholas D. Commisso, Victor, both of N.Y.

[73] Assignee: Mobil Oil Corporation, New York, N.Y.

[22] Filed: Aug. 17, 1973

[21] Appl. No.: 389,398

Related U.S. Application Data
[63] Continuation of Ser. No. 182,334, Sept. 21, 1971, abandoned.

[52] U.S. Cl. ............. 264/161; 264/92; 264/153; 264/237; 264/321; 264/322
[51] Int. Cl.² ............................. B29D 27/00
[58] Field of Search ....... 264/91, 92, 237, 321, 322, 264/348, 161, 153

[56] References Cited
UNITED STATES PATENTS

| | | | |
|---|---|---|---|
| 2,305,433 | 12/1942 | Kyle | 264/338 |
| 3,444,282 | 5/1969 | Burkett | 264/92 X |
| 3,488,411 | 1/1970 | Goldman | 264/92 X |
| 3,640,668 | 2/1972 | Brown et al. | 264/321 X |

*Primary Examiner*—Robert F. White
*Assistant Examiner*—Thomas P. Pavelko
*Attorney, Agent, or Firm*—Charles A. Huggett; James D. Tierney

[57] ABSTRACT

A method for the production of thermoformed plastic articles and particularly thermoplastic foam articles which comprises preheating a sheet of thermoplastic material, subsequently thermoforming the preheated sheet by bringing it into contact with a first molding element, removing the thermoformed article from the first mold element and subsequently, while the article is still at a thermoformable temperature bringing the article into contact with a second mold element maintained at a cooler temperature than the first mold to permanently set the thermoformed article whereby warpage of the article is either completely eliminated or substantially reduced, following its removal from the thermoforming operation.

4 Claims, 8 Drawing Figures

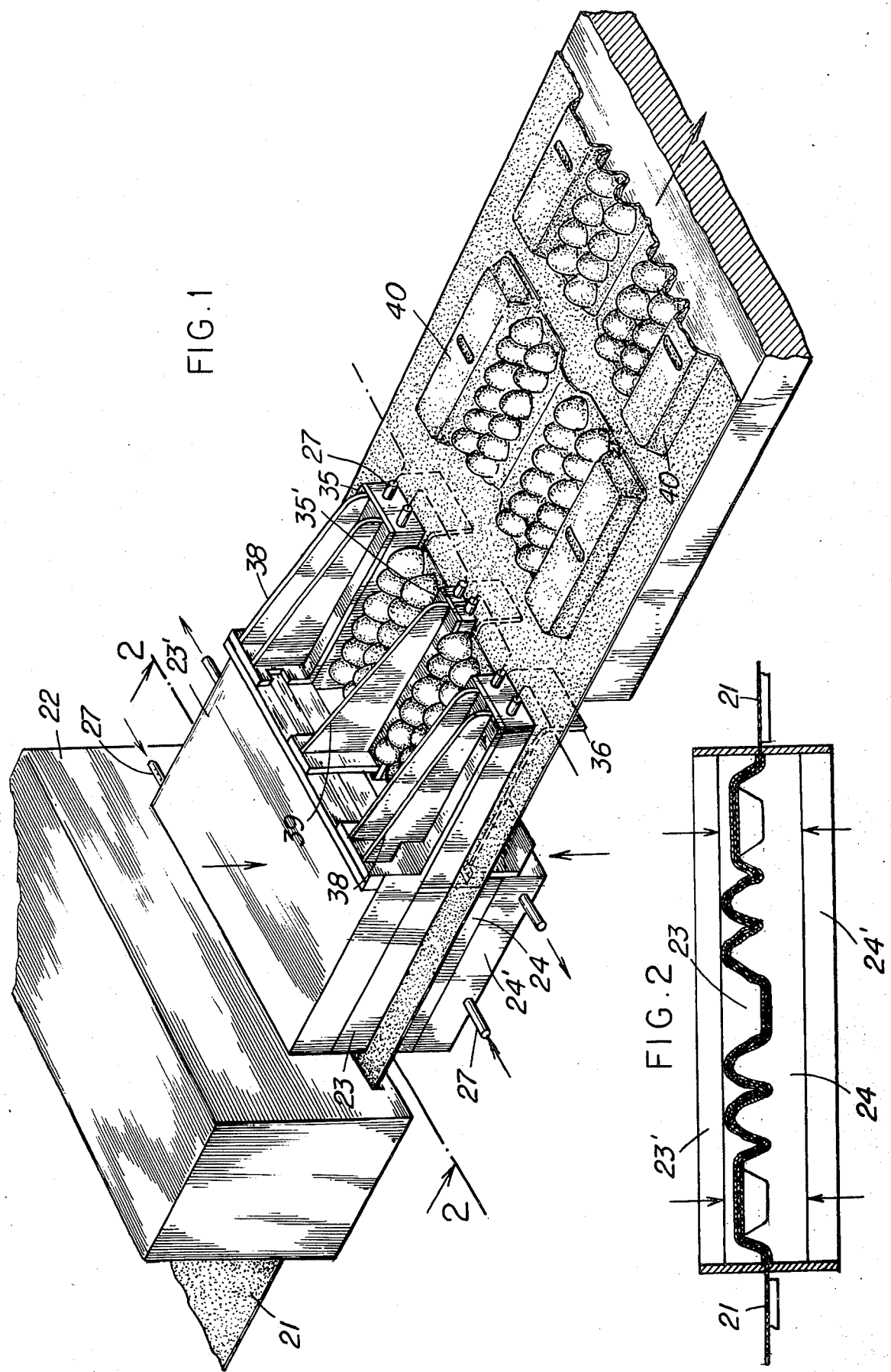

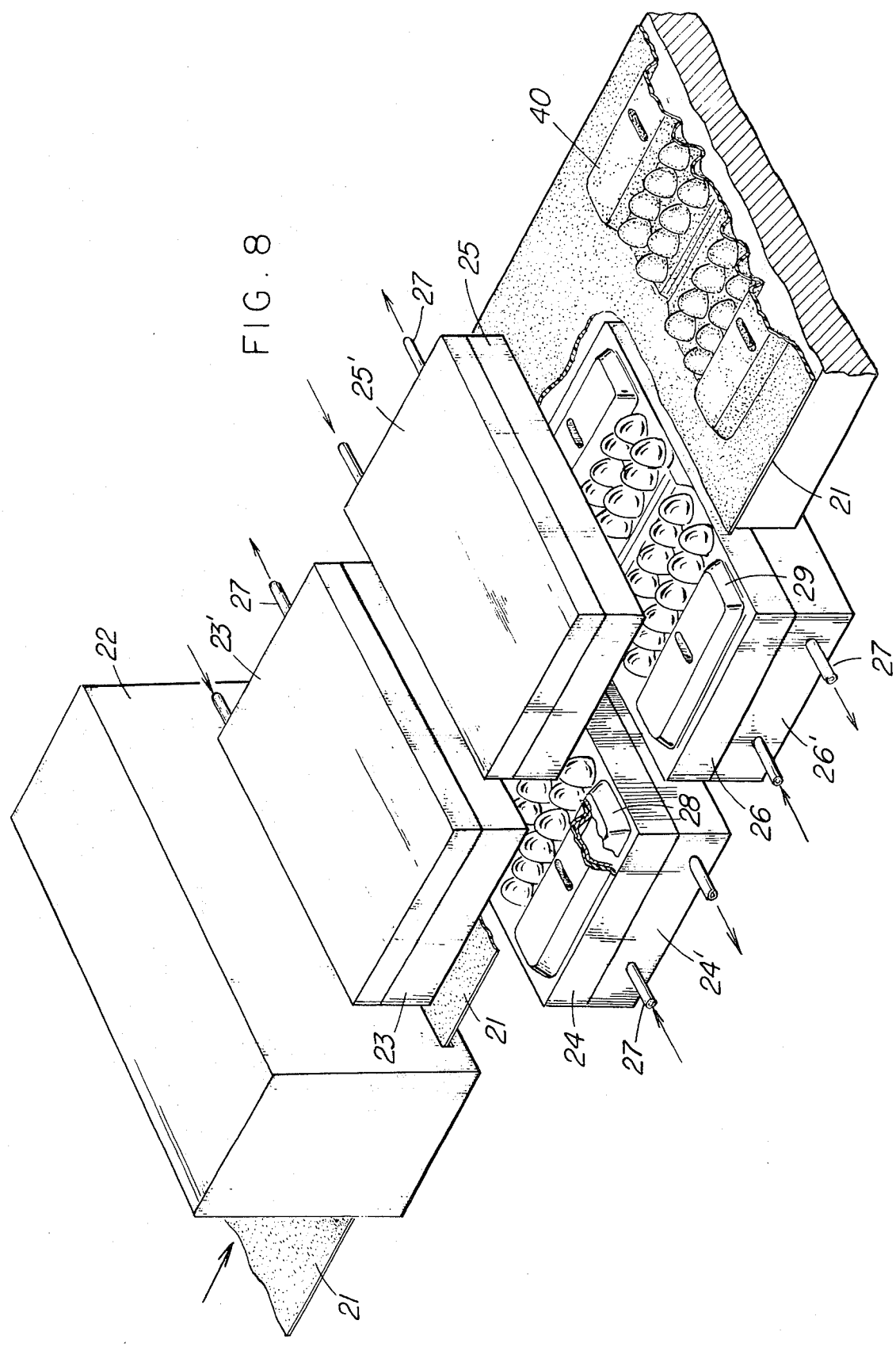

ic articles which comprises preheating a relatively flat
THERMOFORMING PLASTIC ARTICLES This is a continuation, of application Ser. No. 182,334, filed Sept. 21, 1971, now abandoned.

BACKGROUND OF THE INVENTION

1. Field of the Invention

The present invention relates to a method and apparatus for the production of thermoformed plastic articles employing a thermoforming operation whereby the article to be formed is subjected to at least two thermoforming operations. The first thermoforming operation comprises forming the article from a preheated thermoplastic sheet by impressing it against the surface of a mold element. Subsequently, while the now-formed thermoplastic article is still at a heat deformable temperature, bringing the article into contact with the surface of a second mold element, the surface of the second mold element having a temperature below that of the first mold element surface. Following removal of the article from said cooler, second mold station, warpage and deformation of the thermoformed article is either completely eliminated or substantially reduced by virtue of its contact with the second cooler molding element which permanently sizes and sets the article by lowering its temperature.

2. Description of the Prior Art

In the past thermoplastic articles have been formed by a variety of molding techniques which include injection molding, casting, rotational molding, thermoforming and the like. The latter thermoforming method generally comprises bringing a preheated sheet of thermoplastic material into contact with the surface of a molding element and forcing the preheated thermoplastic sheet to assume the configuration of the surface of said mold element by impressing it there against utilizing, for example, a second matching mold element which forces and presses the preheated sheet to conform to the interior surface of the first mold element. It has been found that, when utilizing prior art thermoforming techniques to form plastic articles, such as egg cartons or trays for example, following removal of the article from the forming mold there is a tendency for the article to deform due to the residual heat contained in the formed article causing forces of thermal expansion and contraction to act within the still warm structure. Additionally, materials such as polystyrene foam, during extrusion and sheet forming operations tend to become oriented. When such oriented materials are subjected to heat during a molding operation, unless they are positively restrained, they have a tendency to disorient at elevated temperatures causing undesirable distortion and warpage in the final product. Such distortion has been particularly troublesome when attempts have been made to thermoform plastic articles from foam materials such as for example polystyrene foam. In many instances cartons formed from such foam materials such as an egg carton, have formed thereon integral locking elements, which elements do not function properly after formation of the carton due to the warpage and distortion following the molding operation. The locking elements in such cartons are no longer in proper alignment for secure locking registration as a result of the aforedescribed warpage of the structure.

SUMMARY OF THE INVENTION

The present invention relates to a method and apparatus for the production of thermoformed thermoplastic articles which comprises preheating a relatively flat sheet of thermoplastic material to at least its forming temperature. Thereafter the preheated sheet is thermoformed by impressing it against the surface of a forming mold element. Subsequently, the thermoformed article is removed from the first mold element, and while the thermoformed article is still at an elevated or thermoforming temperature, it is impressed against the surface of a second mold element to lower its temperature sufficiently to permanently set the desired shape of the thermoformed article thereby avoiding subsequent distortion of the article following its removal from the second mold element.

BRIEF DESCRIPTION OF THE DRAWINGS

FIG. 1 is a schematic representation of an embodiment of the thermoforming and post-forming and cooling apparatus of the present invention.

FIG. 2 is a cross sectional view taken on line 2—2 of FIG. 1.

FIG. 8 is a schematic representation of another form of thermoforming and post-forming and cooling apparatus which may be employed in the practice of the present invention.

DESCRIPTION OF SPECIFIC EMBODIMENTS

In the commercial production of thermoformed thermoplastic articles, such as for example egg cartons, a principal limiting factor on production rates is the requisite residence time of the article in the mold after it has been shaped by the mold. Premature removal of the article from the mold before it has been sufficiently cooled results in the unrestrained hot article warping and distorting, especially in the case of oriented polystyrene foam, the residual internal heat in the article setting up mechanical stresses such as shrinkage caused by disorientation of the form thereby deforming the desired shape of the article. Ideally, this problem could be eliminated by maintaining the forming mold at very low temperatures to immediately form and size the article and lower its temperature to a point where no distortion occurs upon removal of the formed article from the mold. However, there is a limiting factor which requires that the forming mold temperature be maintained at a certain minimum temperature. In the case of polystyrene foam that temperature is from about 40° to about 50°F. When the mold is maintained at temperatures substantially below this minimum temperature to effect rapid cooling of the formed article, the article in the case of polystyrene foam will fracture or fail to form and result in puncturing of the foam sheet.

Applicants in accord with the present invention have now substantially reduced or eliminated these forming difficulties by, as more fully described in the following illustrative examples, employing a two stage molding operation. The first molding stage forms an article from the preheated foam sheet and the second molding stage sizes the article, by cooling the already formed article to a temperature which is sufficiently low to eliminate warpage of the article following its removal from the second mold cooling system. Such an arrangement allows for the production of thermoformed articles employing a minimum residence time in the forming molds thereby increasing production rates on the order of fifty percent and higher.

EXAMPLE I

Figure 4:
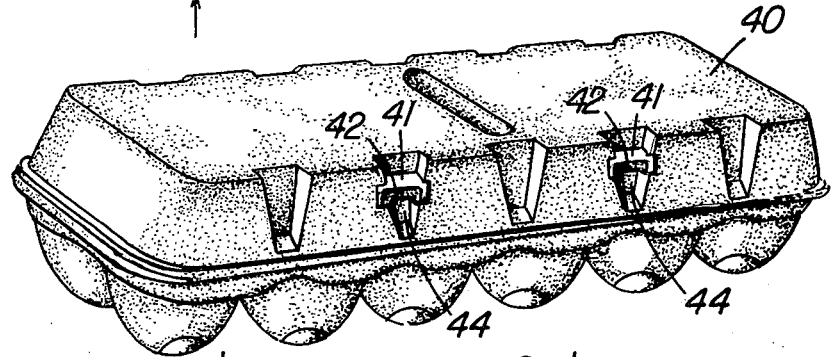
FIG. 4 is a front elevational view of a thermoformed product, specifically an egg carton, which may be produced with the apparatus of FIG. 1.

As shown in FIG. 8, a continuous length of polystyrene foam sheet 21, produced in accordance with the method disclosed in U.S. Pat. No. 3,444,283 was passed through an enclosed preheat oven 22. The oven was maintained at a temperature of from about 600° to about 800°F. The polystyrene foam sheeting 21 was advanced through the oven 22 by a pair of advancing, continuous chain members (not shown) located at opposite sides of the oven which engaged and advanced the longitudinal edges of the foam sheeting. The heating elements in the oven, employed to preheat the foam sheet, consisted of banks of Calrod heating elements positioned about 6 inches above and below the foam sheeting as it was advanced through the oven. The thickness of the sheeting as it entered the oven was approximately 90 mils and expansion of the sheet resulting from its passage through the preheat oven resulted in a sheet thickness upon its exit from the oven of about 180 mils. The length of the preheat oven 22 was approximately five feet. The temperature of the foam sheeting 21 as it exited from the preheat oven was approximately 200°F. As illustrated in FIG. 8, positioned immediately adjacent the end of the preheat oven were a pair of matched metal (aluminum) forming molds. The female mold element 23 was positioned above the advancing heated foam sheet and the male mold element 24 was positioned below the sheet. In FIG. 8, the polystyrene sheeting is shown as being broken away to show the configuration of the surface of male mold elements 24 and 26, the contours of these mold surfaces, as well as the upper female mold surfaces on molds 23 and 25, being substantially identical. The forward motion of the sheet 21 was interrupted as the mold elements 23 and 24 were brought together to thermoform the preheated polystyrene sheet to form an egg carton as illustrated in FIG. 4. As the mold elements 23 and 24 are retracted the polystyrene sheet was advanced approximately 12 ½ inches bringing the thermoformed carton into position intermediate the post mold cooling elements 25 and 26, also illustrated in FIG. 8. As the first pair of forming mold elements (23 and 24) begin to cycle, to form a new carton the post mold cooling element 25 and 26 simultaneously cycle into contact with the formed carton structure. As more clearly illustrated in FIG. 8 the male 26 and female mold 25 elements in the post mold cooling apparatus are identical to the contour and shape of the mold elements 23 and 24 employed to form the carton. As the post mold cooling elements 25 and 26 retract, after cooling the already formed carton, the sheet is again advanced and the formed and cooled carton 40 is trimmed from the sheet at a trim station (not shown). As illustrated in FIG. 8, both the forming molds and the post mold cooling molds are cooled utilizing separate external cooling assemblies, 23'; 24' and 25'; 26' respectively, which comprise hollow plates; affixed to the back surface of each of the mold elements. A cooling fluid, such as water for example, was continuously circulated through the plates, through conduit orifices 27. It will be noted that the cooling assemblies for the forming molds 23 and 24 was a separate system from the cooling assemblies 25' and 26' for the post mold cooling molds 25 and 26. This allows a temperature differential to be maintained between the forming and cooling assemblies. The forming molds 23 and 24 in the above example were maintained at a temperature of about 140°F., whereas the temperature of the cooling molds 25 and 26 was maintained at about 40°F. The dwell time of the carton in the forming molds was 1.5 seconds and the dwell time of the carton in the cooling molds was 1.5 seconds. The operation wherein double molds were employed to produce two cartons per molding cycle was conducted at a rate of 28 cycles per minute, i.e. both the forming molds and the cooling molds cycle 28 times in one minute forming 56 cartons per minute.

EXAMPLE II

Figure 3:
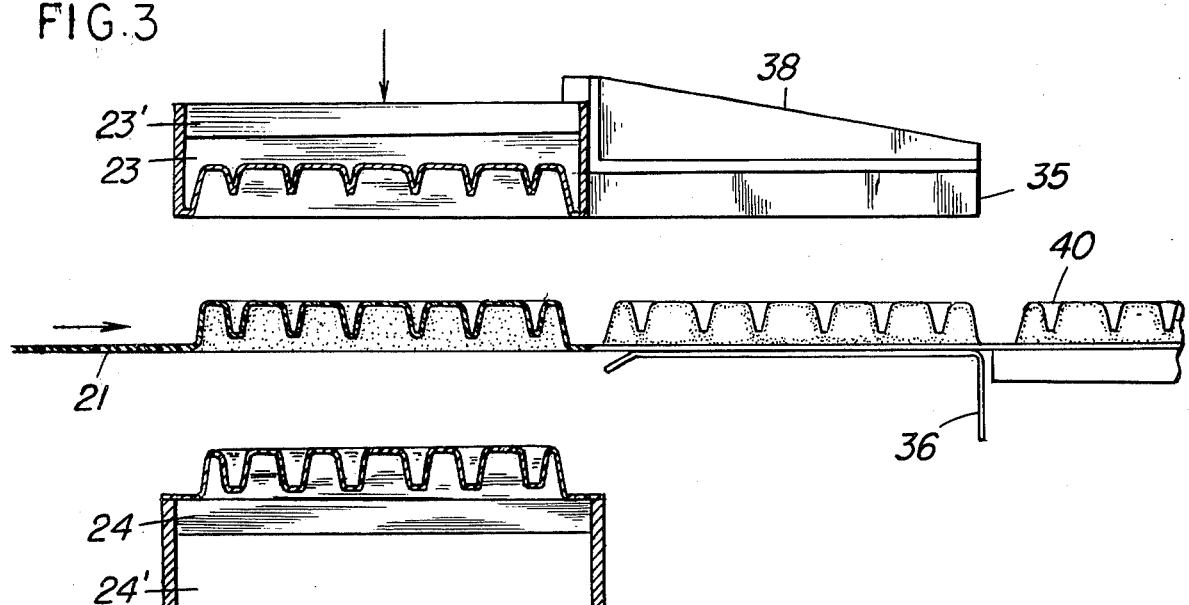
FIG. 3 is a cross sectional side elevational view of the apparatus illustrated in FIG. 1 when the molding elements are in a retracted position.

The post mold cooling portion of the apparatus illustrated in FIG. 8 was modified as shown in FIGS. 1 and 3. Rather than use an identical set of matched metal molds for cooling the formed cartons, the upper female mold portions 35 comprised two inverted, hollow, box-like, internally cooled members which were mounted adjacent mold 33 by bracket plates 38 and positioned so that in operation they cycled to contact and cool the cover portions of the cartons and the side and end walls depending from said cover. Additionally, as more clearly shown in FIG. 1, the formed carton locking flaps were cooled utilizing internally cooled plate member 35' which contacted the carton flaps when the cooling mold was cycled into operative position. The bottom portion of the carton covers and the carton flaps were supported during the post mold cooling step utilizing support plate members 36. No post cooling of the carton cellular sections was conducted utilizing the apparatus embodiment of FIGS. 1 and 3. The polystyrene foam feed stock was identical to that employed in Example I. The conditions of temperature during preheat were also identical. The temperature of the forming molds were maintained, in this instance, at about 55° to about 60°F. The temperature of the post mold cooling elements were maintained at least 5° to 10°F. below the temperature of the forming molds. In actual practice the temperature differential or drop between the forming mold temperature and the temperature of the post-cooling mold elements may range from about 5°F. up to about 100°F.

The rate of carton production was the same as that described in Example I. The finished cartons, as in the case of the cartons produced in Example I showed no distortion such as bowing out of the cover front wall as shown in phantom in FIG. 5. The cartons when closed had perfect and secure registry of the locking elements located on the carton locking flap and the front wall of the carton cover.

Figure 7:
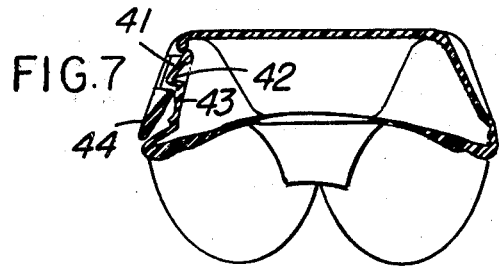
FIG. 7 is a cross sectional view taken on line 7—7 of FIG. 5.
Figure 6:
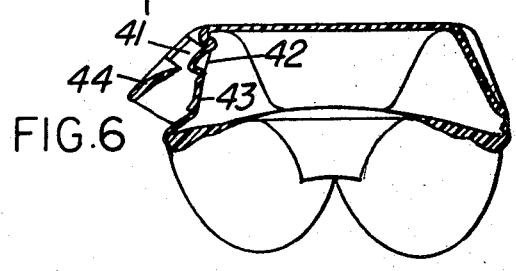
FIG. 6 is a cross sectional view taken on line 6—6 of FIG. 5.

As shown in FIGS. 4 through 7 inclusive, which illustrate one type of product which may be fabricated from the apparatus and method of the present invention, vis an egg carton 40, which comprises a bottom cellular section, an inverted dish-like cover section integrally hinged along one longitudinal edge thereof, and a latching flap 43 hinged to the opposite longitudinal edge of the bottom cellular section. The latching flap is characterized by having two inwardly projecting detent members 44, which when the carton is closed and the latching flap has been folded up inside the front wall of the cover, lockingly engage latching bars 42 on latching flap 43, as shown in FIGS. 4 and 7. Apertures 41 may be provided in the carton cover front wall to allow for manual disengagement of latching bar 42 from the upper edge of detent 44 to open the carton.

Figure 5:
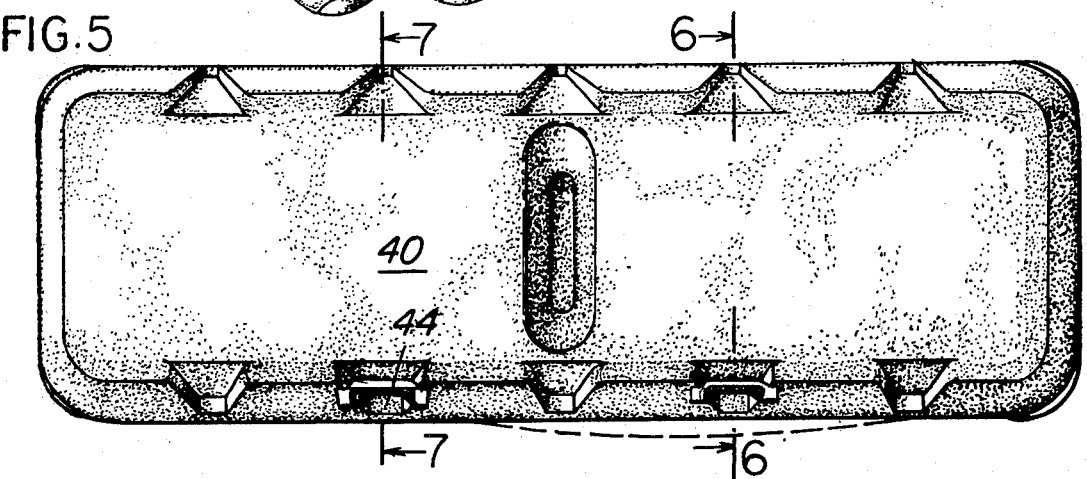
FIG. 5 is an overhead view of the carton illustrated in FIG. 4.

As shown by the phantom (dotted) line in FIG. 5, the front wall of the cover may bow outwardly if care is not taken during carton fabrication to employ applicant's post mold cooling process and apparatus herein disclosed. Such bowing or warpage results when the carton is closed in the latching elements 42 and 43 not engaging to hold the carton sections in a properly locked arrangement as clearly shown in FIG. 6.

Although the present invention has been described with certain specific embodiments, it is to be understood that modifications and variations may be resorted to without departing from the spirit and scope of this invention as those skilled in the art will readily understand. Such modifications and variations are considered to be within the purview and scope of the appended claims.

What is claimed is:

1. A process for the production of a thermoformed thermoplastic article which comprises providing a relatively flat oriented sheet of polystyrene foam, preheating said sheet to at least its forming temperature, thermoforming said preheated sheet by impressing it against the surface of a first mold element removing said thermoformed article from said first mold element while said thermoformed article is still at an elevated and deformable temperature; directly impressing post mold cooling mold elements against at least portions of both sides of said thermoformed article thereby restraining at least said portions of said article against deformation and simultaneously cooling said portions below deformation temperature to avoid substantial distortion of said article upon removal from said post mold cooling mold elements.

2. A process in accordance with claim 1 wherein the surface temperature of said second mold element is at least 5°F. below the surface temperature of said first mold element.

3. A process for the production of a thermoformed thermoplastic egg carton, said egg carton comprising a bottom cellular section, an inverted dish-like cover section integrally hinged along one longitudinal edge of said cover, and a latching flap hinged to the opposite longitudinal edge of the bottom cellular section, which process comprises providing a relatively flat sheet of oriented polystyrene foam material, preheating said sheet to at least its forming temperature, thermoforming said preheated sheet to form an egg carton of said structure by impressing said preheated sheet against the surface of a first mold element, removing the formed egg carton from said first mold element, and while said egg carton is still at an elevated and deformable temperature, directly impressing the interior and exterior surfaces of said egg carton cover and said egg carton latching flap against the surface of post mold cooling mold elements thereby restraining at least said cover and flap of said egg carton against deformation and simultaneously cooling below deformation temperature to avoid subsequent deformation and warpage of said carton upon removal from said post mold cooling mold elements.

4. A process for the production of a thermoformed thermoplastic egg carton from oriented polystyrene foam sheet, said egg carton comprising a bottom cellular section, an inverted dish-like cover section integrally hinged along one longitudinal edge of said cover, said cover section having at least two inwardly projecting locking detents adapted to lockingly engage at least two inwardly projecting recesses located on a latching flap hinged to a longitudinal edge of said bottom cellular section, said recesses lockingly engaging said detents when said cover is in a closed position, said process comprising providing a relatively flat sheet of polystyrene foam, preheating said sheet to at least its forming temperature, thermoforming said egg carton in said preheated sheet by impressing said preheated sheet against the surface of a first mold element, removing the sheet containing said egg carton from said first mold element and, while the egg carton in said sheet is in an unsupported condition but still at an elevated temperature and deformable condition, immediately contacting the interior and exterior surfaces of only the cover and latching flap of the carton against the surface of post mold cooling mold elements simultaneously cooling said cover and said latching flap below their heat deformation temperature to avoid substantial distortion of said egg carton upon removal from said post mold cooling mold elements thereby maintaining said projecting locking detents and said projecting recesses in alignment for locking engagement when said carton is closed, and trimming said egg carton from said sheet.

* * * * *